United States Patent [19]

Onose et al.

[11] Patent Number: 4,759,427
[45] Date of Patent: Jul. 26, 1988

[54] NOZZLE ASSEMBLY OF A CONSTANT FINE LUBRICATION DEVICE

[75] Inventors: Yoshiaki Onose, Odawara; Yasushi Morita; Teruhiko Abe, both of Fujisawa, all of Japan

[73] Assignee: Nippon Seiko Kabushiki Kaisha, Tokyo, Japan

[21] Appl. No.: 921,831

[22] Filed: Oct. 21, 1986

Related U.S. Application Data

[63] Continuation of Ser. No. 699,196, Feb. 7, 1985, abandoned.

[30] Foreign Application Priority Data

Nov. 5, 1984 [JP] Japan ............................ 59-167693[U]

[51] Int. Cl.⁴ .......................... F01M 1/08; F16N 5/00; F16N 21/00
[52] U.S. Cl. ........................................ 184/6.26; 184/8; 184/39.1; 184/55.1; 384/466; 384/551; 384/906; 239/600
[58] Field of Search ...................... 184/6.11, 6.14, 6.15, 184/6.26, 8, 4, 39.1, 55.1, 55.2; 239/600; 384/466, 906, 551; 285/94, 356, 393

[56] References Cited

U.S. PATENT DOCUMENTS

| | | |
|---|---|---|
| 536,824 | 4/1895 | Zimmerman ............................ 184/8 |
| 1,797,280 | 3/1931 | Zerk ...................................... 285/94 |
| 2,150,042 | 3/1939 | Shultz .................................... 285/393 |
| 2,373,555 | 4/1945 | Folke .................................... 184/6.26 |
| 3,042,462 | 7/1962 | Rosskopf ............................... 184/6.26 |
| 3,406,912 | 10/1968 | Claffey ................................. 239/533.3 |
| 3,543,879 | 12/1970 | Munn .................................... 184/6.26 |
| 3,606,936 | 9/1971 | Obergefell ............................ 184/55.2 |
| 3,658,154 | 4/1972 | Benko .................................... 184/8 |
| 4,006,944 | 2/1977 | Ando ..................................... 384/466 |
| 4,084,750 | 4/1978 | Fett ....................................... 239/600 |
| 4,219,161 | 8/1980 | Freissle ................................. 239/600 |
| 4,340,262 | 7/1982 | Rugh ..................................... 384/906 |
| 4,342,489 | 8/1982 | Lenz ...................................... 184/6.11 |
| 4,343,378 | 8/1982 | Bremer .................................. 184/6.26 |
| 4,359,141 | 11/1982 | Schnell .................................. 184/6.26 |
| 4,390,330 | 6/1983 | Kodama ................................. 184/6.26 |

OTHER PUBLICATIONS

Nippon Seiko K.K., Oil-Air Lubricator, "Fine-Lub", 1/1982.
Onose, Yoshiaki, Nippon Seiko K.K., "Bearings for High-Speed Machine Tools and Effects of Oil-Air Lubrication", 1/1981.
Woerner's "Oil-Air Lubrication" believed to have been published in 1/1982.
"Ball Bearing Journal", No. 208, 1/1981.

Primary Examiner—Carlton R. Croyle
Assistant Examiner—Jane E. Obee
Attorney, Agent, or Firm—Shapiro and Shapiro

[57] ABSTRACT

The nozzle assembly of a constant fine lubrication device in which a line extending from a constant fine lubricant supplying unit extends into the oil hole of a nozzle top mounted on a holding member for holding an object to be lubricated so that lubricating oil is injected from the nozzle of the nozzle top to the object to be lubricated.

7 Claims, 4 Drawing Sheets

NOZZLE ASSEMBLY OF A CONSTANT FINE LUBRICATION DEVICE

This is a continuation application of Ser. No. 699,196 filed Feb. 7, 1985, now abandoned.

BACKGROUND OF THE INVENTION

1. Field of the Invention

This invention relates to the nozzle assembly of a constant fine lubrication device.

2. Description of the Prior Art

In recent years, there has been a trend toward very high the rotational speeds of the spindles of machine tools. Expressing this trend in terms of the so-called dm·n value (dm: average diameter of bearings, n: number of revolutions), it has heretofore been 300,000–400,000, whereas nowadays dm·n values exceeding 800,000 are required. However, if the dm·n value exceeds 800,000, it gives rise to problems such as temperature rise and increased torque and therefore, conventional grease lubrication using grease which is quick in deterioration cannot be used. Besides grease lubrication, forcible lubrication and mist lubrication are known, but they are not free from various problems if the dm·n value is of the order of 800,000.

Under such circumstances, in recent years, so-called constant fine or very small quantity lubrication has been adopted instead of the above-mentioned lubrication systems. The constant fine lubrication device is a device in which a constant very small quantity of lubricating oil supplied from a constant fine lubricant supplying unit is carried on an air stream and injected from a nozzle to an object to be lubricated.

The constant fine lubrication is such that a very small quantity of lubricating oil of the order of 0.01–0.03 cc/30 min. is constantly supplied to the object to be lubricated and therefore, it is required that no leakage and stagnation of the oil occur in the path leading from the constant fine lubricant supplying unit to the object to be lubricated. For this reason, pipe seams and variations in diameter must be avoided.

However, heretofore, for example, where a bearing is to be lubricated, the distal end of the pipe has been connected to the oil hole of a housing by a joint and lubricating oil has been injected from the oil hole of the housing to the oil hole of an outer race spacer and from a nozzle to the bearing. In this case, there is a gap between the housing and the spacer and there is a difference in diameter between the oil hole of the housing and the oil hole of the outer race spacer and therefore, there has been an undesirable possibility that smooth flow of the lubricating oil is hampered in this portion and the lubricating oil leaks around this portion.

SUMMARY OF THE INVENTION

It is an object of the present invention to eliminate the above-noted disadvantages peculiar to the prior art, that is, to provide the nozzle assembly of a constant fine lubricant supplying device in which a constant very small quantity of lubricating oil delivered from a constant fine lubricant supplying unit can be reliably supplied to an object to be lubricated without leaking on the route.

It is another object of the present invention to provide a nozzle assembly in which the position of a nozzle relative to the object to be lubricated can be accurately determined.

According to the present invention, in the nozzle assembly of a constant fine lubrication device, leakage of oil in the supply path of lubricating oil is prevented and the positioning of a nozzle top is properly effected, whereby the lubricating oil is injected from a nozzle to a desired region of the object to be lubricated. Also, threading the nozzle top (in some embodiments) or placing a blind plug on the nozzle top is unnecessary and this leads to a reduced manufacturing cost, and the possibility of a seal member mixing with the lubricating oil is eliminated.

DESCRIPTION OF THE PREFERRED EMBODIMENTS

Some embodiments of the present invention will hereinafter be described by reference to the drawings.

Figure 1:
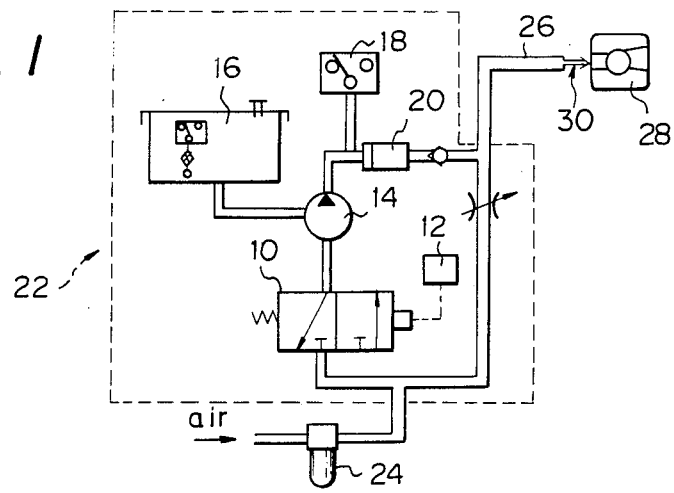
FIG. 1 is a block diagram showing an example of the constant fine lubrication device.

A constant fine lubricant supplying unit will first be described by reference to FIG. 1. In FIG. 1, reference numeral 10 designates a solenoid valve, reference numeral 12 denotes a timer, reference numeral 14 designates a pump, reference numeral 16 denotes a tank provided with a float switch, reference numeral 18 designates a pressure switch, and reference numeral 20 denotes a constant amount piston. These together constitute a constant fine lubricant supplying unit 22. Air is supplied to the unit 22 through an air filter 24. A vinyl pipe 26 or the like is used as the piping from the unit 22 to a bearing 28.

The pump 14 is intermittently operated by the solenoid valve 10 and the timer 12, and the lubricating oil taken out from the tank 16 is fed into the constant quantity piston 20, and a constant very small quantity of oil is supplied into the air stream by the action of the constant quantity piston 20. The oil so supplied into the air stream flows along the inner wall of the pipe 26 and is supplied from a nozzle 30 to the bearing 28.

Figure 2:
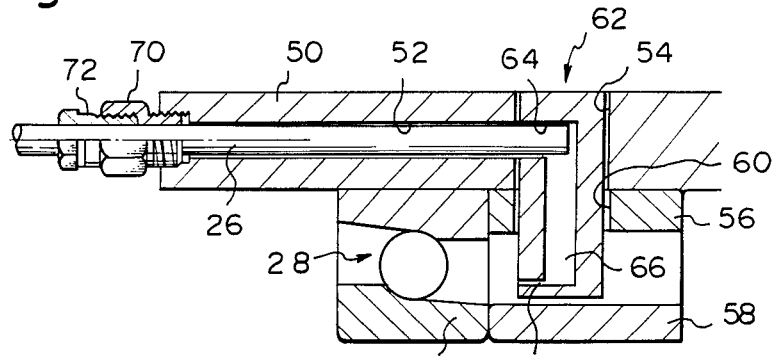
FIGS. 2, 3, 4, 5 and 6 are cross-sectional views showing embodiments of the present invention.

A nozzle assembly will hereinafter be described. The embodiment shown in FIG. 2 is a case where a bearing is provided at the inner part of the machine body and oil cannot be directly supplied from outside a housing 50. A pipe receiving bore 52 of circular cross-section is formed in the housing 50 parallel to the axial direction of the bearing 28 (the left to right direction as viewed in FIG. 2), and an internally threaded bore 54 for threadably engaging a nozzle top is formed continuously to the pipe receiving bore 52 parallel to the radial direction of the bearing 28. The ball bearing 28 and a pair of spacers 56 and 58 are juxtaposed on the inner periphery side of the housing 50. A top receiving hole 60 coincident with the internally threaded bore 54 is formed radially in the outer race spacer 56.

A rod shaped nozzle body or top 62 is inserted radially of the housing 50 through the internally threaded bore 54 of the housing 50 and the top receiving hole 60 of the outer race spacer 56 and is fixed at a predetermined position by a male screw thread being threadably engaged with the internally threaded bore 54. Also, the nozzle top 62 is formed into a U-shaped cross-section with a pipe receiving bore 64 extending parallel to the axial direction of the bearing 28 (transverse to the nozzle top), an oil hole or passage 66 extending parallel to the radial direction of the bearing 28 (axially of the nozzle top), and the nozzle 30 constituted by a bore extending parallel to the pipe receiving bore 64 (transverse to the nozzle top). The nozzle bore 30 is positioned to terminate near the outer peripheral surface of the inner race 29 of the bearing 28.

The entrance portion (the left end portion as viewed in FIG. 2) of the pipe receiving bore 52 formed in the housing 50 is formed with a female thread, with which is threadably engaged a male thread formed on the outer peripheral surface of the post-like portion of a joint 70. A female thread is formed on the inner peripheral surface of the cylindrical portion of the joint 70 and is threadably engaged by the male thread of a plug 72. The vinyl pipe 26 is inserted in the pipe receiving bore 52 and is fixedly held on the housing 50 by the joint 70 and the plug 72.

According to the present embodiment, the lubricating oil flow path from the constant fine lubricant supplying unit 22 to the nozzle 30 is constituted by only the single vinyl pipe 26 and the oil hole 66 of the nozzle top 62 and there is no seam and no difference in diameter in the course of the flow path and thus, the constant very small quantity of lubricating oil supplied from the unit 22 reliably passes to the nozzle 30 without leaking or stagnating in the course of the flow-path. There is some difference in diameter between the pipe 26 and the nozzle top 62, but the pipe 26 enters into the central portion of the nozzle top 62 and therefore, there is no undesirable possibility of oil leakage occurring between the pipe 26 and the housing 50, between the housing 50 and the nozzle top 62 or between the housing 50 and the spacer 56.

The pipe receiving bore 52 of the housing 50 and the top receiving hole 60 of the outer race spacer 56 may be of a greater diameter and the inner walls thereof may be rough, because they do not regulate the quantity of oil. Accordingly, there is also provided an advantage in that the cost of boring is reduced. Further, the nozzle top 62 is secured to the housing 50 by screw threads and therefore, if it is rotated and moved radially, the direction and position of the nozzle 30 can be chosen at an optimum position relative to the bearing 28.

Figure 3:
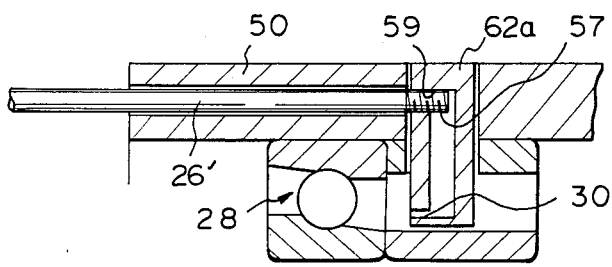

Another embodiment of the present invention will now be described by reference to FIG. 3. This embodiment differs from the above-described embodiment in the manner in which the pipe 26' is fixedly held on the nozzle top 62a. That is, a male thread 57 formed on the outer peripheral surface of the end portion of a metallic pipe 26' is threadably engaged with a female thread 59 formed axially of a nozzle top 62a, thereby playing the role of the joint 70 and plug 72 in the previous embodiment.

Embodiments in which oil is supplied from outside the housing 50 will hereinafter be described successively.

Figure 4:
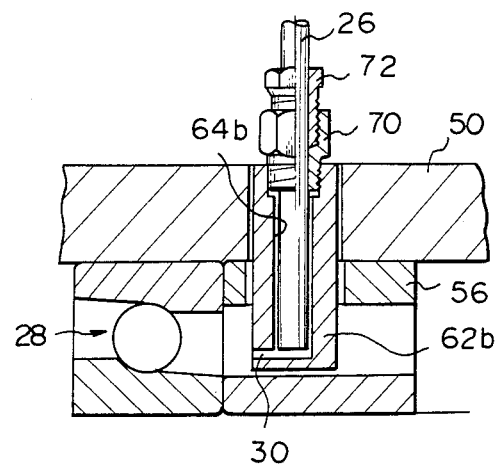

In an embodiment shown in FIG. 4, a pipe receiving bore 64b extending radially and a nozzle 30 extending axially are continuously formed in a nozzle top 62b. A vinyl pipe 26 extends through the pipe receiving bore 64b and is fixedly held on a housing 50 by a joint 70 and a plug 72 as in the first embodiment.

According to this embodiment, the oil supply path from the constant fine lubricant supplying unit 22 to the nozzle 30 is constituted substantially by only the single vinyl pipe 26 and therefore, there is no possibility of oil leakage and oil stagnation in the course of the oil supply path, and also, the working of the housing 50, the outer race spacer 56, etc. is simple.

Figure 5:
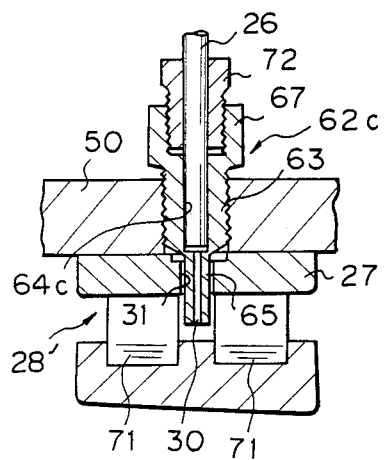

In an embodiment shown in FIG. 5, the present invention is applied to a double row roller bearing 28' and stress is put on the shape of a nozzle top 62c. More specifically, the nozzle top 62c comprises a large-diametered portion 63, a small-diametered portion 65 and a cylindrical portion 67, and a male thread is formed on the outer peripheral surface of the large-diametered portion 63 and a pipe receiving bore 64c is formed in the central portion thereof, while a nozzle 30 is formed in the central portion of the small-diametered portion 65. The nozzle top 62c is fixed at a predetermined position by the male thread of the large-diametered portion being threadably engaged with the female thead of a housing 50, and the small-diametered portion 65 extends through an insertion hole 31 formed in an outer race 27 and extends between two roller rows 71. A vinyl pipe 26 is mounted on the housing 50 by the nozzle top 62c and a plug 72.

Figure 6:
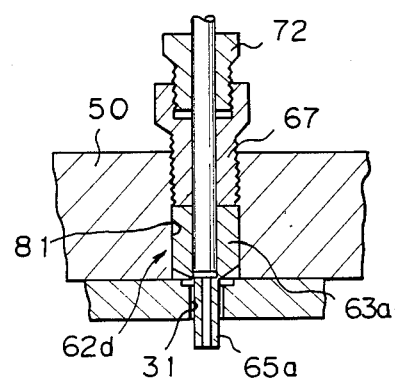

In an embodiment shown in FIG. 6, a male thread is not formed on the large-diametered portion 63a of a nozzle top 62d, and the nozzle top 62d is inserted into the top receiving bore 81 of a housing 50 and the top receiving bore 31 of an outer race 27, whereafter it is held at a position shown in FIG. 6 by a joint 67 threadably engaged with the female thread of the housing 50 and a plug 72 threadably engaged with the joint 67.

A nozzle assembly in which nozzle top positioning means is provided will hereinafter be described. In an embodiment shown in FIG. 7, lubricating oil is supplied from a direction parallel to the axis of a bearing 128. More particularly, the bearing 128, an outer race spacer 140 and an inner race spacer 148 are mounted inside a housing 150. A pipe 126 is inserted in a pipe receiving bore 152 formed in the axial direction (the left to right direction as viewed in FIG. 7) of the housing 150, and this pipe 126 is positioned and fixed to the housing 150 by a joint 156 threadably engaged with a threaded hole formed at the entrance portion of the pipe receiving bore 152 and a plug 158 threadably engaged with the joint 156.

A top receiving hole 160 is formed in the housing 150 in a direction perpendicular to the pipe receiving bore 152, and a nozzle top 170 is inserted in the top receiving hole 160. The nozzle top 170 comprises an outer (upper as viewed in FIG. 7) large-diametered portion 172 and an inner small-diametered portion 174, and a stepped portion 177 is formed between said two portions 172 and 174. A circular shallow recess 142 is formed radially in the outer peripheral surface of the outer race spacer 140, and a circular through-hole 144 is further formed radially in the central portion thereof. The small-diametered portion 174 of the nozzle top 170 extends through the through-hole 144, and the stepped portion 177 is seated on the stepped portion 146 between the recess 142 and the through-hole 144.

An oil hole 176 extending lengthwise of the nozzle top 170, a lateral hole 178 branching off from the upper end portion of the oil hole 176 and a nozzle 130 continuous to the fore end portion of the oil hole 176 are formed in the central portion of the nozzle top 170. The lateral hole 178 is in communication with the pipe 126, and the nozzle 130 is situated sideways of the retainer 129 of the bearing 128. A key 184 is interposed between a cut-away 180 formed in the large-diametered portion 172 of the nozzle top 170 and a cut-away 182 formed in that portion of the housing 150 which is opposed to the cut-away 180, thereby keying the nozzle top 170. A disc-like rubber packing 186 is placed outside the nozzle top 170 and the protruded portion 188 thereof closes the opening portion of the oil hole 176 of the nozzle top 170. A plug 198 is threadably engaged with a threaded hole 190 formed in the opening portion of the top receiving hole 160 of the housing 150 and urges the nozzle top 170 radially inwardly, whereby the stepped portion 177 bears against the stepped portion 146.

In the present embodiment, the lubricating oil supplied from the constant fine lubricant supplying unit 22 through the pipe 126 enters the oil hole 176 through the lateral hole 178 and is injected from the nozzle 130 to the bearing 128. In this case, the lubricating oil supply path leading from the supplying unit 22 to the nozzle 130 is formed by the pipe 126 and the nozzle top 170 and there is substantially no seam or step difference in the course thereof and therefore, the lubricating oil supplied from the supplying unit 22 does not leak or stagnate but is reliably injected to the bearing 128.

Also, the nozzle top 170 is urged by the plug 198 through the rubber packing 186 with its stepped portion 177 bearing against the stepped portion 146 of the outer race spacer 140 and the key 184 is interposed between the nozzle top 170 and the housing 150. Therefore, the position of the nozzle 130 is accurately determined both radially and circumferentially and the lubricating oil can be injected to a desired region of the bearing 128.

Figure 7:
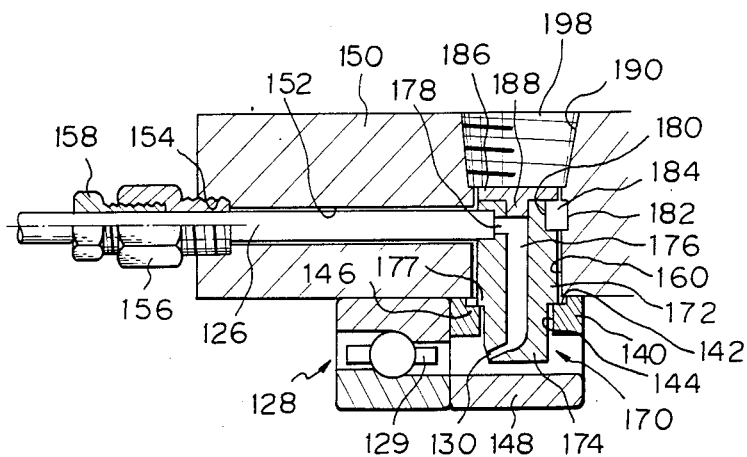
FIGS. 7, 8, 9, 10 and 11 are cross-sectional views showing improved embodiments of the present invention.

Heretofore, threading of the insertion hole of the housing and the nozzle top to mount the nozzle top in the housing has been employed, but according to embodiments of the present invention such as FIG. 7, this becomes unnecessary and therefore, the manufacturing cost is reduced. Also, heretofore, a blind plug has been placed on the nozzle top during the insertion of the pipe, but in the present invention, the rubber packing 186 is used and this also leads to a reduced manufacturing cost. Further, the seal member heretofore wound on the nozzle top becomes unnecessary, reducing complexity, and there is no possibility of the seal member being mixed with the lubricating oil.

Figure 8:
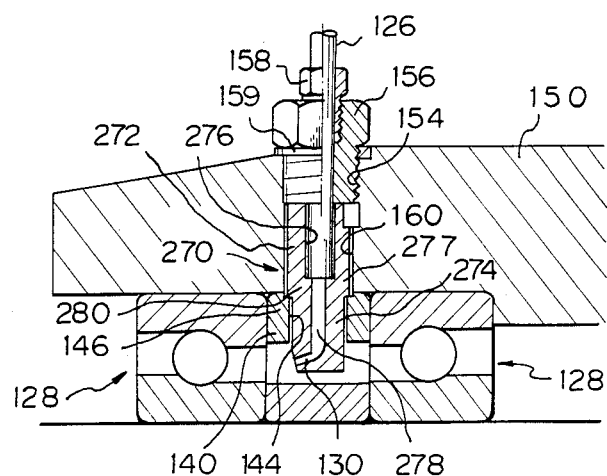

Still another embodiment of the present invention will now be described by reference to FIG. 8. In this embodiment, the lubricating oil is supplied from a direction perpendicular to the axis of the bearing 128. More particularly, the large-diametered portion 272 of a nozzle top 270 is inserted in a nozzle top receiving hole 160 formed radially in the housing 150, the small-diametered portion 274 of the nozzle top 270 extends through the through-hole 144 of the outer race spacer 140, and the stepped portion 277 of the nozzle top 270 is seated on the stepped portion 146 of the outer race spacer 140. The nozzle top 270 is provided with a central large-diametered oil hole 276, a small-diametered oil hole 278 and a nozzle 130 extending therefrom. A pipe 126 radially enters into a stepped portion 280 formed between the large-diametered oil hole 276 and the small-diametered oil hole 278, and this pipe 126 is positioned and fixed to the housing 150 by a joint 156 threadably engaged with a threaded hole 154 formed in the opening portion of the insertion hole of the housing 150 and a plug 158 threadably engaged with the joint 156. A ring-like gasket 159 is interposed between the joint 156 and the housing 150. Another nozzle top (not shown) is provided in the housing 150 and oil is supplied from the rightwardly facing nozzle thereof to the right bearing.

Figure 9:
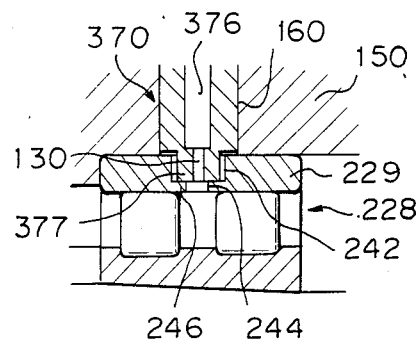

In the present embodiment, there is no step difference and no seam in the lubricating oil supply path leading from the supplying unit 22 to the nozzle 130, and the nozzle 130 has its radial position determined by the stepped portion 277 of the nozzle top 270 bearing against the stepped portion 146 of the outer race spacer 140 and therefore, the bearing 128 is well lubricated by the injection from the nozzle 130.

Where a roller bearing 228 as shown in FIG. 9 is to be lubricated as another embodiment, a radial recess 242 is formed in the axially intermediate portion of an outer race 229 and further, a radial through-hole 244 is formed in the central portion thereof. A nozzle top 370 in which an oil hole 376 and a nozzle 130 are formed axially may be inserted into the insertion hole 160 of the housing 150, and the fore end 377 thereof may be seated on the stepped portion 246 of the outer race 229 so that the nozzle 130 may be coincident with a through-hole 244.

Figure 10:
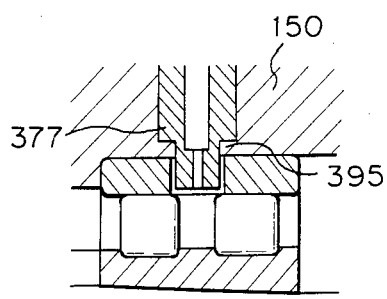

Also, to avoid deformation of the outer race 229, a stepped portion 395 may be provided on the housing 150 as shown in FIG. 10, instead of a stepped portion being provided on the outer race 229 as in the above-described embodiment.

Figure 11:
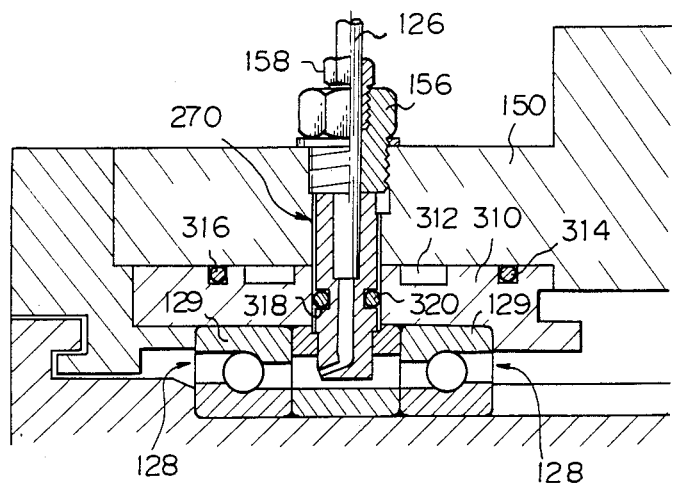

Still another embodiment of the present invention will now be described by reference to FIG. 11. A feature of this embodiment is that seal members 316 and 320 are provided for preventing leakage of cooling oil. More particularly, a ring-like oil groove 312 is formed in the outer peripheral surface of an outer cylinder 310 for holding the outer race 129 of the bearing 128, and cooling oil flows in the oil groove to cool the bearing 128. A ring-like seal groove 314 is formed in the outer cylinder 310 outwardly of the oil groove 312 and an O-ring 316 is mounted in the seal groove 314 to keep the space between the outer cylinder 310 and the housing 150 liquid-tight. Also, an O-ring 320 is mounted in a ring-like seal groove 318 formed in the outer peripheral surface of the nozzle top 270 to keep the space between the outer cylinder 310 and the nozzle top 270 liquid-tight. In the other points, the present embodiment is basically identical to the embodiment shown in FIG. 8.

We claim:

1. Bearing lubricating apparatus comprising:
    a bearing assembly comprising a bearing including inner and outer coaxial races defining an annular bearing space and rolling elements disposed between said races, and spacer means including an inner annular ring axially juxtaposed with the inner race in end-to-end relation therewith and an outer annular ring axially juxtaposed with the outer race in end-to-end relation therewith, the inner and outer annular rings forming an annular space communicating with the annular bearing space, the outer annular ring having a radial bore;
    a housing having an inner surface on which the outer race and the outer annular ring of the bearing assembly are held, the housing having a radial bore extending perpendicular to a rotational axis of the bearing and aligned with the radial bore of the outer annular ring;
    a nozzle body separate from said housing and said spacer means and having a first portion extending through the radial bore of the housing and a second portion integral with the first portion and extending through the radial bore of the outer annular ring of the bearing assembly, the nozzle body being secured to the housing at the first portion, the nozzle body having an oil hole extending therethrough in the direction of said radial bores, an inlet at one end of the oil hole and an outlet at the other end of the oil hole opened in the annular space of the spacer means and directed toward the annular bearing space; and an oil supply pipe separate from and secured to the housing, said oil supply pipe extending through the housing and having an end portion inserted in said inlet;

whereby a very small amount of oil may be fed by a constant fine lubricant supplying unit into the oil supply pipe at predetermined intervals by means of a constant quantity piston and moved along an inner surface of the oil supply pipe by an airstream to the bearing assembly.

2. Apparatus for lubricating a bearing including inner and outer coaxial races defining an annular bearing space and plural rolling members disposed between the races, in which a constant fine lubricant supplying unit feeds a very small amount of oil into a single continuous seamless supply pipe at predetermined intervals by means of a constant quantity piston, and in which the oil is moved along an inner wall of the supply pipe by an airstream for delivery to the bearing, said apparatus comprising:

a housing having an inner surface on which the outer race of the bearing is held, and having a radial bore extending perpendicular to a rotational axis of the bearing;

spacer means including an inner annular ring and an outer annular ring disposed coaxially therewith to form an annular space communicating with the annular bearing space, the inner annular ring being axially juxtaposed with the inner race in end-to-end relation therewith, the outer annular ring being axially juxtaposed with the outer race in end-to-end relation therewith, the outer annular ring being held on the inner surface of the housing and having a radial bore aligned wtih the radial bore of the housing;

a nozzle body separate from said housing and said spacer means and having a first portion extending through the radial bore of the housing and a second portion integral with the first portion and extending through the radial bore of the outer annular ring, the nozzle body being secured to the housing at the first portion, and having an oil hole extending therethrough in the direction of said radial bores, the oil hole having an inlet into which an end portion of the supply pipe is inserted, the supply pipe being separate from the housing and extending therethrough, and the oil hole having an outlet opened in the annular space of the spacer means and directed to the annular bearing space; and means for securing the supply pipe to the bushing so as to maintain a predetermined length of the end portion inserted into the inlet of the oil hole.

3. Apparatus according to claim 2, wherein the pipe securing means comprises a threaded portion formed on an outer surface of the pipe end portion and threaded into a threaded portion formed on an inner surface of the oil hole inlet.

4. Apparatus according to claim 2, wherein the oil hole inlet of the nozzle body is oriented in a direction perpendicular to the rotational axis of the bearing.

5. Apparatus according to claim 4, wherein said pipe securing means comprises a joint having a bore through which the pipe extends and that is threadably engaged with an inlet of said radial bore of the housing, and a plug through which the pipe extends and that is threadably engaged with said bore of the joint.

6. Apparatus according to claim 2, wherein the housing has a pipe-receiving bore therein extending parallel to the rotational axis of the bearing and through which said supply pipe extends for insertion of said end portion thereof into the inlet of the oil hole, and wherein the outlet of the oil hole is oriented to move oil through said outlet in a direction opposite to the direction in which said pipe is inserted into said inlet.

7. Apparatus according to claim 6, wherein said pipe securing means comprises a joint having a bore through which the pipe extends and that is threadably engaged with an inlet of the pipe-receiving bore of the housing, and a plug through which the pipe extends and that is threadably engaged with said bore of the joint.

* * * * *